G. A. FILMAN.
WIND BREAK ATTACHMENT TO HAY TEDDERS.
APPLICATION FILED AUG. 24, 1908.

945,028.  Patented Jan. 4, 1910.

Witnesses
Jas Gadsby
G. Nicholson

Inventor
George A. Filman
By W. Bruce
Atty.

UNITED STATES PATENT OFFICE.

GEORGE A. FILMAN, OF BARTON TOWNSHIP, WENTWORTH COUNTY, ONTARIO, CANADA.

WIND-BREAK ATTACHMENT TO HAY-TEDDERS.

945,028. Specification of Letters Patent. Patented Jan. 4, 1910.

Application filed August 24, 1908. Serial No. 449,899.

*To all whom it may concern:*

Be it known that I, GEORGE A. FILMAN, a citizen of the Dominion of Canada, residing in the township of Barton, in the county of Wentworth, Province of Ontario, Canada, have invented a certain new and useful Wind-Break Attachment to Hay-Tedders; and I do hereby declare that the following is a full, clear, and exact description of the construction and operation of the same.

The invention relates to a very handy and convenient attachment to hay tedders as will be explained in full hereinafter.

There is one objectionable feature in the operation of the usual form of hay tedders. When the machine is obliged to be driven with the wind, as the forks are operating on a shaft with a number of cranks, each fork being carried on a crank of the drive shaft, the wind coming on the rear of the tedder, blows the loose hay, (thrown up by the forks to dry it) against the cranks of the drive shaft and winds around them giving much trouble and annoyance to the driver, causing him to dismount frequently from his seat, and cut the hay loose with a knife entailing much loss of valuable time, and stoppage of the work, besides increased draft, which makes it harder on the horses.

The object of my invention is mechanism attached to the tedder to prevent the hay as it is being thrown about by the forks from being blown on the cranks of the drive shaft to impede their motion.

The horizontal bars are bolted to the rear end of the said beams of the tedder frame, and the slats stand out in the rear of the forks just far enough to be out of the way of their action, and effectually prevents any loose hay from being blown against the rotating cranks to which the forks are attached. The tedder with the said wind break attachment can be operated at any angle to the wind and it has been found by experiment that the cranks of the drive shaft are amply protected from the liability of having hay wound around them by the wind.

I attain these objects by the mechanism illustrated in the accompanying drawing in which,—

Figure 1:
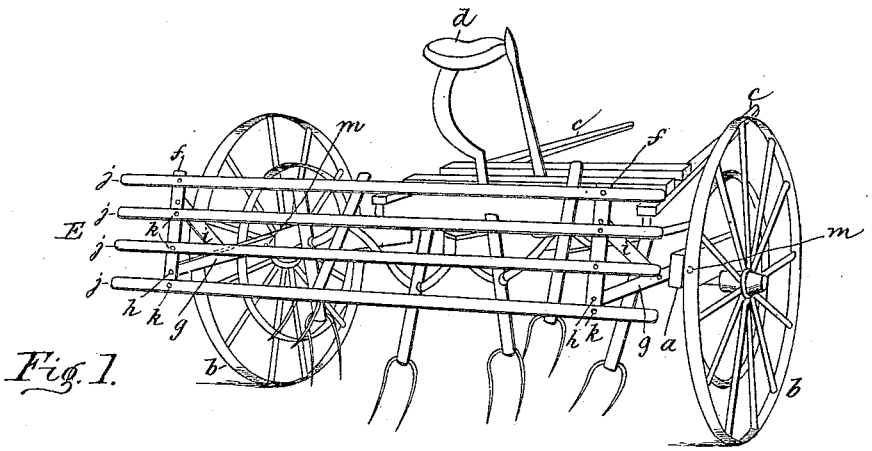
Figure 2:
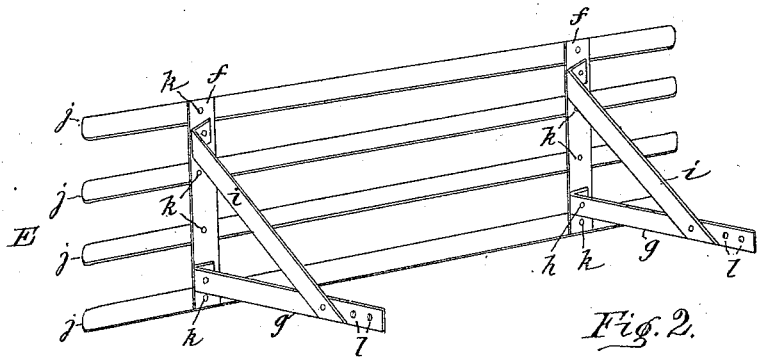
Figure 3:
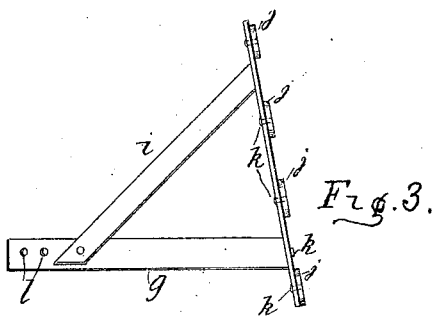

Figure 1, is a perspective view of a hay tedder with my wind break attachment secured thereto,—Fig. 2, represents a rear perspective view of the attachment, detached. Fig. 3, is an end view showing the slant of the standards.

Similar letters refer to similar parts throughout the several views.

*a*, represents the side beams of the hay tedder, *b*, the wheels, *c*, the shafts, *d*, the driver's seat, E, the wind break attachment consisting of the upright standards *f, f*, having the horizontal bars *g, g*, bolted to the said standards by bolts *h, h*.

*i, i*, are braces securing the standards *f, f*, to the horizontal bars *g, g*.

*j, j, j, j*, are the horizontal slats secured to the standards *f, f*, by bolts or rivets *k*, leaving a space between each slat, and their length will be about the width of the tedder, preferably of wood, being lighter than metal.

The lowest slat will be when attached to the tedder about from twelve to eighteen inches above the ground. There are two holes *l, l*, bored in the ends of the horizontal bars *g, g*, corresponding holes being made in the side beams of the frame, through which bolts *m, m*, are made to pass through both beams, which affixes the whole wind break attachment to the tedder.

The attachment, being light, can be permanently secured to the tedder if desired, and always be with it or attached to it when wanted, there is no inconvenience or extra weight to prevent the tedder from not operating easily in the hay field with the wind break attachment added. It may be observed that instead of the wooden slats *j*, on the standards woven wire or the equivalent material could be employed, but I prefer the slats.

Having thus described my device and its advantages, what I claim as my invention and desire to secure by Letters Patent is,

In combination with a hay tedder provided with a drive shaft having rotating cranks, of horizontal bars (g) attached to the frame of the tedder, upright standards (f) attached to the bars, braces (i) connecting the horizontal bars (g) and the standards (f), a series of slats connecting the standards (f) (f), having open spaces to allow the wind to pass through but not the hay, all constructed for a windbreak to prevent cut hay from obstructing the rotating cranks of the drive shaft during the operation of the tedder.

Hamilton, Ontario, August, 19th 1908.

GEORGE A. FILMAN.

Signed in the presence of—
G. NICHOLSON,
WM. BRUCE.